(12) United States Patent
Nguyen et al.

(10) Patent No.: US 11,640,163 B1
(45) Date of Patent: May 2, 2023

(54) EVENT TIME CHARACTERIZATION AND PREDICTION IN MULTIVARIATE EVENT SEQUENCE DOMAINS TO SUPPORT IMPROVED PROCESS RELIABILITY

(71) Applicant: INTERNATIONAL BUSINESS MACHINES CORPORATION, Armonk, NY (US)

(72) Inventors: Nam H. Nguyen, Pleasantville, NY (US); Bhanukiran Vinzamuri, Long Island City, NY (US); Wesley M. Gifford, Ridgefield, CT (US); Anuradha Bhamidipaty, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/539,179

(22) Filed: Nov. 30, 2021

(51) Int. Cl.
 *G05B 23/02* (2006.01)
(52) U.S. Cl.
 CPC ....... *G05B 23/024* (2013.01); *G05B 23/0221* (2013.01); *G05B 23/0262* (2013.01); *G05B 23/0281* (2013.01)
(58) Field of Classification Search
 CPC ............ G05B 23/024; G05B 23/0221; G05B 23/0262; G05B 23/0281
 See application file for complete search history.

(56) References Cited

U.S. PATENT DOCUMENTS

| 9,658,167 | B2 | 5/2017 | Forster et al. | |
| 9,977,839 | B2 | 5/2018 | Czompo | |
| 2018/0225812 | A1* | 8/2018 | DiVerdi | G06K 9/6223 |
| 2018/0247200 | A1* | 8/2018 | Rolfe | G06N 3/0454 |
| 2021/0072740 | A1* | 3/2021 | Huang | G06F 17/16 |

FOREIGN PATENT DOCUMENTS

| CN | 103491624 A | 1/2014 |
| CN | 105939524 A | 9/2016 |
| DE | 10119396 A1 | 10/2002 |

OTHER PUBLICATIONS

Mell, P. et al., "Recommendations of the National Institute of Standards and Technology"; NIST Special Publication 800-145 (2011); 7 pgs.
Dai, H. et al., "Deep Coevolutionary Network: Embedding User and Item Features for Recommendation"; arXiv:1609.03675v4 [cs.LG] (2017); 10 pgs.

(Continued)

*Primary Examiner* — Mischita L Henson
(74) *Attorney, Agent, or Firm* — Intelletek Law Group, PLLC; Gabriel Daniel, Esq.

(57) ABSTRACT

A computer implemented method of administering a complex system includes receiving multivariate data from a plurality of sensors of the system in an ambient state. Event sequences in the received multivariate data are identified. The multivariate event sequences are projected to a lower stochastic latent embedding. A temporal structure of the sequences is learned in a lower latent space. A probabilistic prediction in the lower latent space is provided. The probabilistic prediction in the lower stochastic latent space is decoded to an event prediction in the ambient state.

18 Claims, 8 Drawing Sheets

(56) References Cited

OTHER PUBLICATIONS

Trivedi, R. et al., "Know-Evolve: Deep Temporal Reasoning for Dynamic Knowledge Graphs"; arXiv:1705.05742v3 [cs.AI] (2017); 15 pgs.
Xiao, S. et al., "Learning Conditional Generative Models for Temporal Point Processes"; The Thirty-Second AAAI Conference on Artificial Intelligence (2018); 8 pgs.
Jing, H. et al., "Neural Survival Recommender"; WSDM (2017); 10 pgs.
Mel, H. et al., "The Neural Hawkes Process: a Neurally Self-Modulating Multivariate Point Process"; arXiv:1612.09328v3 [cs.LG] (2017); 24 pgs.
Xiao, S. et al., "Wasserstein Learning of Deep Generative Point Process Models"; arXiv:1705.08051v1 [cs.LG] (2017); 12 pgs.

\* cited by examiner

EVENT TIME CHARACTERIZATION AND PREDICTION IN MULTIVARIATE EVENT SEQUENCE DOMAINS TO SUPPORT IMPROVED PROCESS RELIABILITY

BACKGROUND

Technical Field

The present disclosure generally relates to plant optimization computer systems, and more particularly, to methods and systems for an automated generation of an optimization model for system-wide plant optimization based on multivariate event data.

Description of the Related Art

Manufacturing and process industries comprise a sitewide network of complex processes, each with a self-contained set of inputs and outputs. The variability in input flows, operational requirements, maintenance, breakdowns, changes in production plans, and the like, makes the production process dynamic. Plant-wide management may involve the ability to predict the dynamic process behavior and to alter any controls to adhere as closely as possible to the production plan.

Today, such plants generate multiple event streams providing multivariate data. A salient aspect of event sequence problems, is to be able to model and/or predict events arising from multiple event streams. These settings events often arrive in different channels at different times. For example, high dimensional event sequences often arise in IoT settings in process industries. In these settings, manufacturing processes may be well instrumented with sensors and control/monitoring systems. Understanding events generated by such control and monitoring systems, as well as providing early warning into future events is salient for safe and efficient operation of such processes.

Existing solutions for predicting events do not apply well to cases where there are large number of possible event types. A typical conversion of the of the multidimensional sequence to a univariate one may destroy the relationship between the event types, thereby losing valuable information. An understanding of the joint behavior of these multiple event streams can facilitate a better adjusted system. Manual optimization model generation is time-consuming, challenging, may involve both domain experts and optimization experts, and is often not practically possible in large scale operations.

SUMMARY

According to various embodiments, a computing device, a non-transitory computer readable storage medium, and a method are provided for administering a system. Multivariate data is received from a plurality of sensors of a system in an ambient state. Event sequences in the received multivariate data are identified. The multivariate event sequences are projected to a lower stochastic latent embedding. A temporal structure of the sequences is learned in a lower latent embedding. A probabilistic prediction in the lower latent space is provided. The probabilistic prediction in the lower stochastic latent space is decoded to an event prediction in the ambient state.

In one embodiment, the multivariate data comprises event sequences of different variables.

In one embodiment, at least some of the different variables are interrelated.

In one embodiment, the event sequences are compressed into a compact representation of latent variables.

In one embodiment, a recurrent neural network (RNN) is used to capture temporal dynamics of an event history from the compact representation.

In one embodiment, learned dynamics in the compact representation are used to detect a period of anomalous behavior of the system.

In one embodiment, projecting the multivariate event sequences to a lower stochastic latent embedding is by way of a variational auto encoder (VAE).

In one embodiment, an uncertainty of the prediction in the ambient state is provided.

In one embodiment, the system is an industrial plant.

In one embodiment, the variables comprise two or more of pressure, temperature, motion, volumetric flow, or sound level.

In one embodiment, one or more components of the system are adjusted to prevent the predicted event.

In one embodiment, multiple time step predictions are provided by autoregressively predicting latent variables at different future points in time.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

Figure 1:
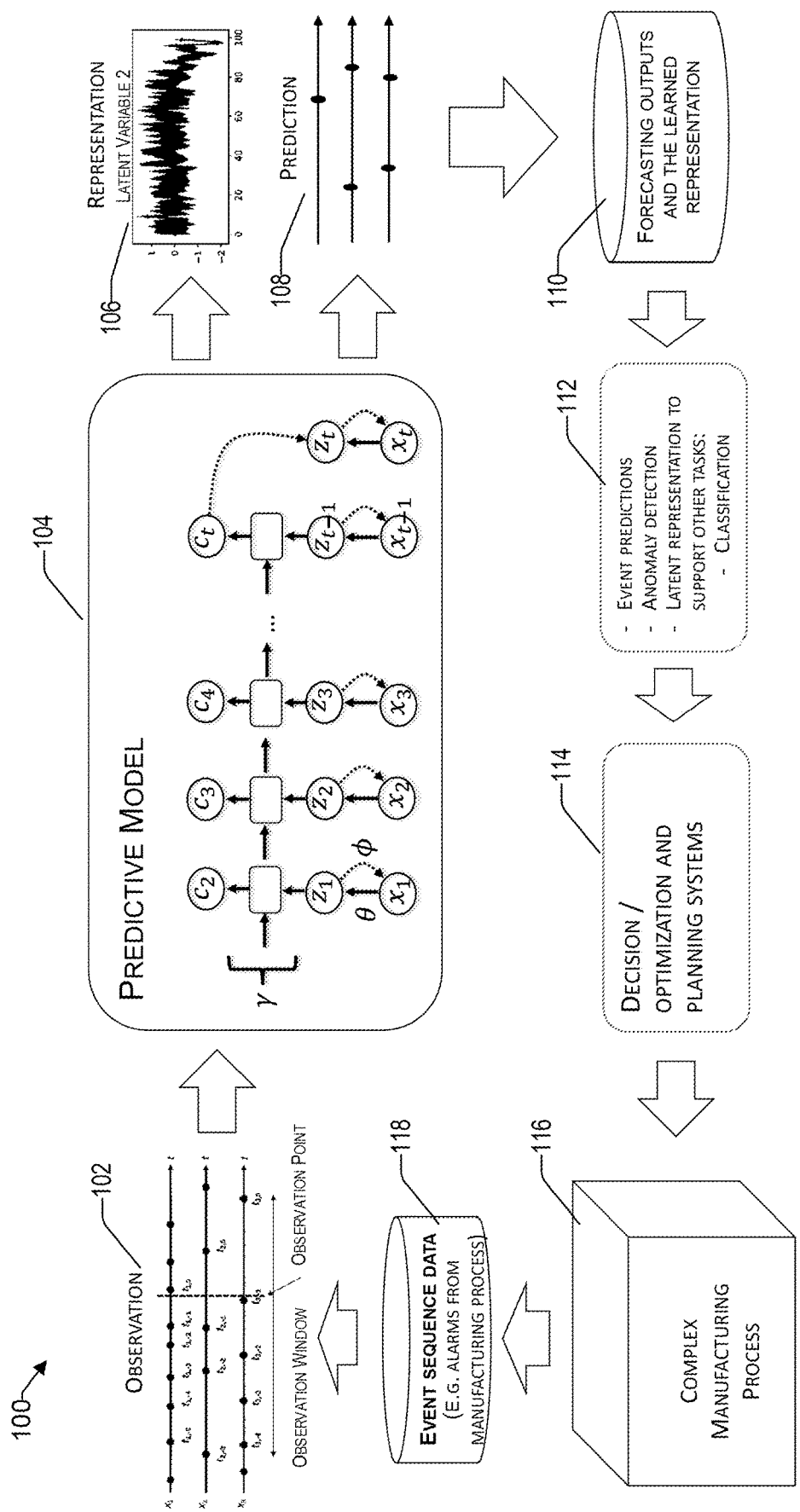
FIG. 1 illustrates an example architecture of a predictive variational autoencoder, consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to systems and methods for time to event characterization and prediction in multivariate event sequence domains to facilitate a more reliable large system having many components and sensors monitoring the same. Today, multivariate point processes (MPPs) are a salient class of temporal point processes (TPPs), which are configured to model random processes with complex temporal dynamics. While univariate TPP models can be successfully applied in various domains, MPPs have been largely unexplored.

Previous implementations using TPP mainly focus on the modelling univariate processes where only a single intensity function, sometimes referred to herein as a variable, is learned. Such framework, however, still faces several fundamental limits: (a) Univariate model input: at each gradient iteration, only an individual sequence is considered to update the parameters, making it hard for the model to learn complex interactions across different sequences; and (b) Intractable learning: maximum likelihood often leads to difficult learning due to the integration of the intensity embedded in the conditional density equation. These limits may be alleviated by assuming the intensity function has a simple exponential form, but such assumption reduces the expressiveness of the model.

Probabilistic prediction of high dimensional sequential data is generally a challenging task, both in terms of computational burden and distribution modelling. Sequential generative models, which have their roots in the variational autoencoder (VAE), can effectively learn from data with temporal dynamics. The teachings herein provide a novel sequential model for MPP applications. Learning of complex interactions between high dimensional event sequences is facilitated. In one aspect, the teachings herein use a novel VAE-based architecture that can capture the event interarrival time distribution, predict a next event in high-dimensional multivariate sequences and simulate the sequences for longer prediction horizons.

In one embodiment, the architecture described herein uses a sparse representation to enable capturing relationships in the presence of a large number of event types and can use strategies to ensure that temporal dynamics and correlation structures of the event sequence is captured. By virtue of the teachings herein, various technical benefits are achieved, including an accuracy of the computing platform coordinating a complex system, such as a manufacturing plant, is improved and the number of events in the complex system accurately calculated (e.g., predicted) and even avoided. The techniques described herein may be implemented in a number of ways. Example implementations are provided below with reference to the following figures.

Example Architecture

FIG. 1 illustrates an example architecture 100 of a predictive variational autoencoder (PVAE), consistent with an illustrative embodiment. There is a multivariate observation data 102 in the form of a plurality of time series that characterize the operation of a complex system, such as a manufacturing plant having many components (e.g., thousands, millions, etc.). This data 102 may be captured by various sensors, such as time, pressure, temperature, motion, volumetric flow, sound, etc. Each of these variables may have certain operation ranges for each component (e.g., piece of equipment). When the operation range is exceeded, it is recorded as an event. Each event is associated with a time stamp. An event in one parameter may be related to a separate parameter, such as increasing temperature with pressure. Such complex interactions between high dimensional event sequences can often arise in IoT settings in process industries. In these industries, complex manufacturing processes are well instrumented with sensors and control/monitoring systems. Understanding events generated by these control and monitoring systems is salient for safe and efficient operation of such processes.

The multivariate observation data 102 is used as a corpus of data from which a predictive model 104 can be constructed. The predictive model 104 is able to capture the event interarrival time distribution and provide a concise representation of the time series of the entire system 106, as well as predict the next event 108 in high-dimensional multivariate sequences. In some embodiments, the model can perform long horizontal prediction without losing much accuracy 102. The training of the predictive model 104, sometimes referred to herein as the machine learning model, may be supervised or unsupervised. In supervised learning, a monitoring server may be presented with example data from the data store as being acceptable. Put differently, the time series observation data 102 acts as a teacher for the model. In unsupervised learning, there are no labels as what is acceptable; rather, it simply provides historic data to the model to find its own structure among the data. In one embodiment, the predictive model 104 is based on self supervised learning (SSL) and does not require any labels on the multivariate observation data 102, which can be regarded as an intermediate form between supervised and unsupervised learning. Some of these concepts are discussed in more detail below The resulting time series of prediction results 108 can be used in different ways. For example, forecasting outputs and the learned representation 110 can be used for event predictions and anomaly detection. In one embodiment, the learnt latent representation 106 can be used for downstream tasks, such as classification. By virtue of being able to accurately predict the different variables in a complex system, events can be planned for and optimized accordingly 114 to accommodate, or even to avoid, future events. To that end, the predicted data is used to adjust the complex manufacturing process 116 and the process continues iteratively by generating new event sequence data 118 which can be fed back to the predictive model 1104.

Figure 2:
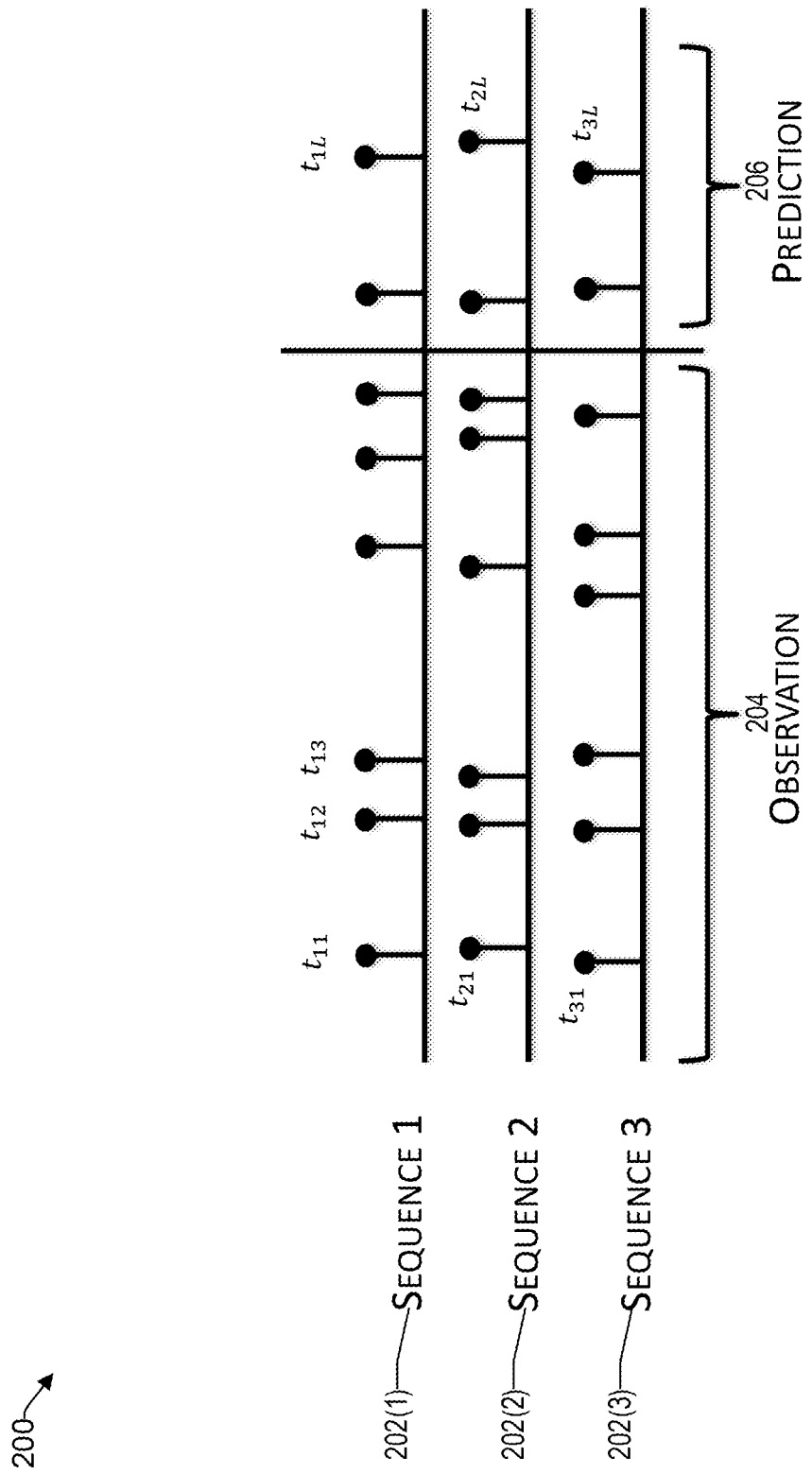
FIG. 2 illustrates an example time multivariate observation data in the form of a plurality of time series, consistent with an illustrative embodiment.

FIG. 2 illustrates an example time multivariate observation data in the form of a plurality of time series 200, consistent with an illustrative embodiment. For simplicity, three sequences 202(1) to 202(3) are shown in FIG. 2, while it will be understood that many (e.g., thousands) of time series are within the scope of the teachings herein. Each time series 202(1) to 202(3) includes an observation phase 204, which is used by the predictive model to learn therefrom, and a prediction phase 206 of future events, where a continuation of each time series is determined by the model. Significantly, each time series (e.g., 202(1) to 202(3)) is not evaluated individually to determine its corresponding continuation; rather, all time series (e.g., 202(1) to 202(3)) are studied in aggregate to find interrelationships therebetween in order to provide a prediction of each respective time series during the prediction phase 206. Stated differently, the model discussed herein can learn to correlate across different event sequences (e.g., time series 202(1) to 202(3)). In one embodiment, the uncertainty prediction interval is provided as well (e.g., via probabilistic modeling of the event inter-arrival).

Example Block Diagram of a Predictive Latent Variational Autoencoder

Figure 3:
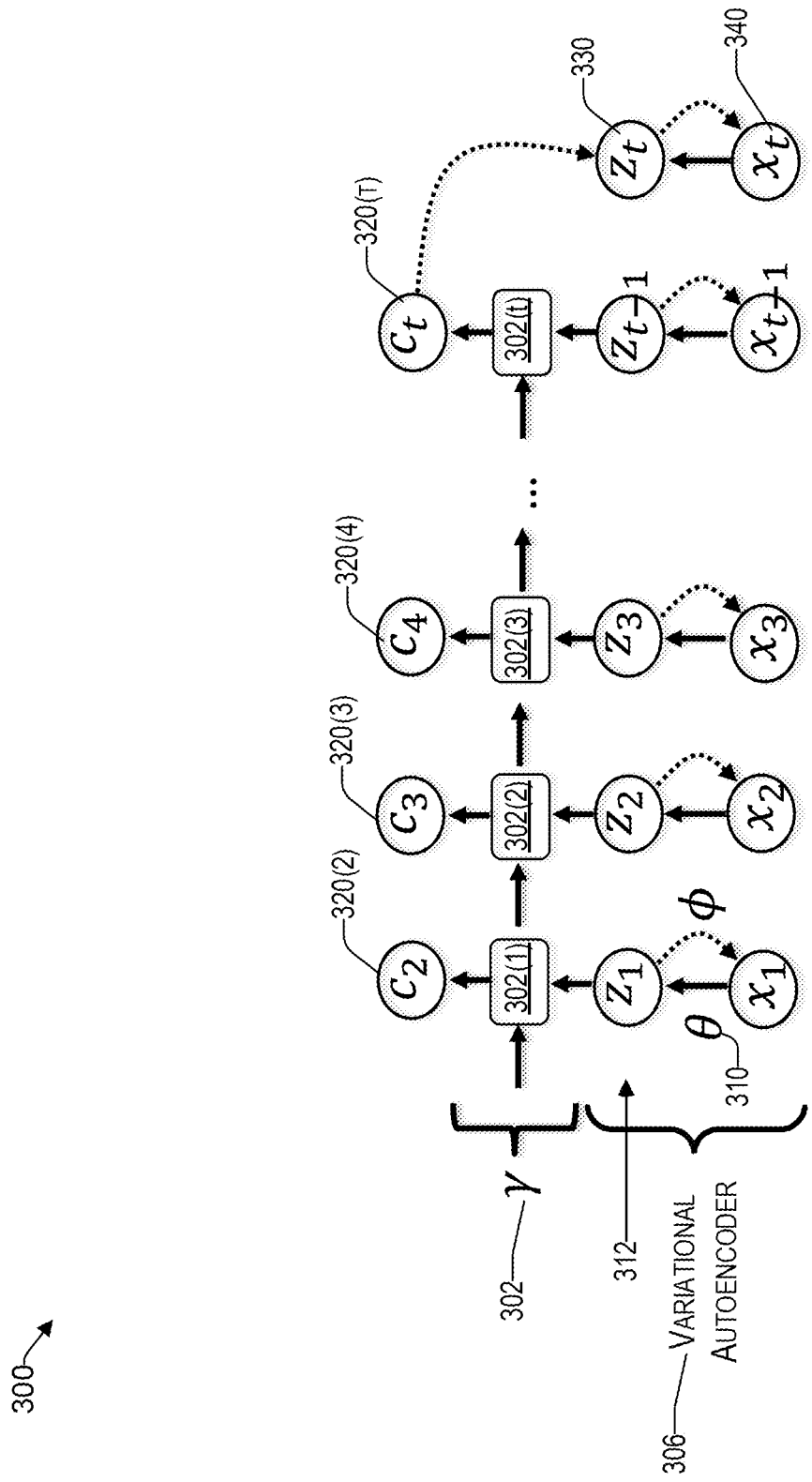
FIG. 3 provides a conceptual block diagram of a predictive latent variational autoencoder, consistent with an illustrative embodiment.

FIG. 3 provides a conceptual block diagram of a predictive latent variational autoencoder (PVAE), consistent with an illustrative embodiment. A variational auto encoder (VAE) is an artificial neural network architecture that is operative to compress the input information into a constrained multivariate latent distribution (i.e., encode) to be able to later reconstruct it as accurately as possible (i.e., decode.)

The PVAE 300 of FIG. 3 provides a new sequential VAE model for a prediction task. The architecture relies on the underlying assumption that the information describing the high dimensional data often lies on a much lower dimensional manifold. For example, in a Hawkes process, the free parameters can be limited by a small number of kernels representing the process, which can be shared across different dimensions. Thus, learning the temporal dependency of event inter-arrivals can essentially be distilled to learning the dynamics of the latent embedding, which is potentially easier to calculate by a computing device due to (a) dimensionality deduction, and (b) high level representation. To provide an accurate reconstruction, latent variables can be enforced to encode high level representation such as smoothness, and unnecessary information such as high frequency noise discarded. These smooth features can be dynamically easier to capture by a computing device via a recurrent network. The PVAE 300 is built on this assumption, and a temporal predictive model is introduced in the latent space to auto-regressively forecast the future (e.g., $Z_t$) and to infer this value back to the event sequence domain. To that end, a regularization is introduced that measures the proximity between the distribution of the past latent variables and that of the current time step.

In PVAE 300, the rectangular shapes 302(1) to 302(t) indicate deterministic states 302. There is a variational encoder 306 that include observed variables at different times $x_1$ to $x_{t-1}$. For example, $x_1$ represents all the event variables captured from various sensors when one of the variables exceeds a predetermined threshold. Thus, $x_1$ can be viewed as a large vector comprising various event types. The high-dimensional observed event inter-arrivals $x_i$ at time i is mapped to a random variable $z_i$ which lies on a lower dimensional manifold. A dimensional manifold is a topological space having the property that each point has a neighborhood that is homeomorphic to an open subset of n-dimensional Euclidean space. This mapping is the deep neural network encoder $q(z_i|x_i)$ of VAE. The PVAE 300 comprises t such separate mappings, which share the same VAE encoder with parameters $\theta$ 310. The latent representations $z_1, \ldots, z_t$ is expected to carry the temporal dynamics of the event sequence. This time-dependent variability is captured by a recurrent neural network (RNN) with deterministic states. Each state of the observed variables (e.g., $x_1$) has a corresponding output (e.g., C2 (320(2)) for $x_1$). The outputs C2 to Ct (320(2) to 320(T)) are used to provide a predicted output in the lower dimensional manifold $Z_t$ 330, which is then used to predict the set of corresponding input variables $x_t$ 340.

For example, output $c_t$ 320 of the recurrent neural network (RNN) is a random variable with distribution $p(c_t|h(z_{1:t-1}))$, where h is a deterministic function parametrized by $\gamma$-parameters of the RNN. The output $c_t$ 320 can be seen as the auxiliary random variable to constraint the two groups of latent random variables, namely (i) the prediction $z_t$ 330 and (ii) the observed history $z_{1:(t-1)}$. The prediction in the input domain, sometimes referred to herein as the ambient domain, is transferred from the prediction in the embedding space.

Given the observed input sequence $x_{1:(t-1)}$, the trained model generates M latent embeddings $z_{1:(t-1)}^{(m)}$, m=1, ..., M via the variational distribution $q(z_i|x_i)$ with i=1, ..., t–1. In this paper, $q(z_i|x_i)$ is a deep neural network parametrized by $\theta$ 310 with a simple distribution form, provided by the expression below:

$$z_i^{(m)} \sim \mathcal{N}(z_i; g_\mu(x_i), g_\sigma(x_i)) \quad i=1, \ldots, t-1 \qquad \text{(Eq. 1)}$$

The average of these latent sample $$\bar{z}_i = \frac{1}{M}\sum_m z_i^{(m)}$$

can be used as the input to the RNN, and the M output samples $c^{(m)}$ is produced by sampling from Gaussian distribution, provided by the expression below:

$$c_t^{(m)} \sim \mathcal{N}(h_\mu(\bar{z}_{1:(t-1)}), h_\sigma(\bar{z}_{1:(t-1)})) \qquad \text{(Eq. 2)}$$

The $\bar{c}_t$—the average over m samples $c_t^{(m)}$ can be seen as the proxy for the latent code $z_t$. The prediction $\hat{x}_t$ is obtained from sampling, as provided by the expression below:

$$x_t \sim \mathcal{N}(f_\mu(\bar{c}_t), f_\sigma(\bar{c}_t)) \qquad \text{(Eq. 3)}$$

Then, taking the mean over these samples. The multiple step-ahead prediction can be produced as follows: once the average sample $z_t$ is attained, it can be used as the input to the recurrent network to produce samples $z_{t+1}$ and consequently yield the output $\hat{x}_{t+1}$. The procedure can be repeated n times to predict n value $z_{t:t+n}$ and their associated $\hat{x}_{t:t+n}$.

Accordingly, the multivariate event sequences $x_1$ to $x_{t-1}$ are projected to a lower stochastic latent embedding 312. The temporal structure of the multivariate event sequences is learned in the latent space 302. A probabilistic prediction in the stochastic latent space Ct 320 is transferred to the event prediction $Z_t$ 330. $C_t$ captures the dynamics of latents $z_1, \ldots, z_{t-1}$ via LSTM and is considered as the surrogate of $z_t$. Thus, the output $C_t$ is 320 is mapped back to the input domain to calculate the prediction $x_t$ 340. The representation 312 is modelled probabilistically. Thus, the prediction samples are obtained by sampling.

The parameters $\phi$ and $\gamma$ of the neural network are learned via maximizing the sum of the log likelihood log $p(x_{1:t})$ with respect to these parameters. Due to the intractability of the likelihood, in one embodiment, a variational distribution $q(c_t, z_{1:t}|x_{1:t})$ is introduced that approximates the posterior $p(c_t, z_{1:t}|x_{1:t})$. The evidence lower bound ELBO is derived from Jensen inequality, as provided by the expression below:

$$\log p(x_{1:t}) = \log \int p(x_{1:t}, c_t, z_{1:t}) \qquad \text{(Eq. 4)}$$

$$= \log \int q(c_t, z_{1:t}|x_{1:t}) \frac{p(x_{1:t}, c_t, z_{1:t})}{q(c_t, z_{1:t}|x_{1:t})}$$

-continued $$\geq \mathbb{E}_{q(c_t, z_{1:t}|x_{1:t})} \log \frac{p(x_{1:t}, c_t, z_{1:t})}{q(c_t, z_{1:t}|x_{1:t})}$$

$$\stackrel{\Delta}{=} \mathcal{L}(\phi, \theta, \gamma; x_{1:t}).$$

In one embodiment, the variational distribution can be parametrized by a deep neural network with parameters $\theta$ and $\gamma$, which can be decomposed as provided below:

$$q(c_t, z_{1:t} | x_{1:t}) = q(c_t | z_{1:t}, x_{1:t}) q(z_{1:t} | x_{1:t}) \quad \text{(Eq. 5)}$$
$$= q(c_t | z_{1:t}, x_{1:t}) \prod_{i=1}^{t} q(z_i | x_i).$$

The factors $q(c_t|z_{1:t}, x_{1:t})$ and $q(z_{1:t}|x_{1:t})$ of the variational distribution are functions of parameters $\gamma$ and $\theta$, respectively. In addition, to facilitate the present discussion, it is assumed that conditioned on $z_t$, random variables $x_t$ and $c_t$ are independent. Thus, the conditional distribution $p(x_{1:t}, c_t, z_{1:t})$ can be written as follows:

$$p(x_{1:t}, c_t z_{1:t}) = p(x_{1:t} | z_{1:t}) p(z_{1:t}) p(c_t | z_t) \quad \text{(Eq. 6)}$$
$$= p(c_t | z_t) p(z_{1:t}) \prod_{i=1}^{t} p(x_i | z_i)$$

With the above decompositions, the lower bound $\mathcal{L}(\phi, \theta, \gamma; X_{1:t})$ can be derived as the expectation with respect to $\mathbb{E}$ of three terms:

$$\sum_{i=1}^{t} \log p(x_i|z_i) + \log \frac{p(c_t|z_t)}{q(c_t|z_{1:t}, x_{1:t})} + \sum_{i=1}^{t} \log \frac{p(z_i)}{q(z_i|x_i)}. \quad \text{(Eq. 7)}$$

The first term is can be written as:

$$\mathbb{E}_{q(c_t|z_{1:t}, x_{1:t}) \prod_{i=1}^{t} q(z_i|x_i)} \sum_{i=1}^{t} \log p(x_i|z_i) = \sum_{i=1}^{t} \mathbb{E}_{q(z_i|x_i)} \log p(x_i|z_i) \quad \text{(Eq. 8)}$$

With the Markov assumption on the variational factor that $q(c_t|z_{1:t}, x_{1:t}) = q(c_t|z_{1:(t-1)})$, the second term yields the following expression:

$$\mathbb{E}_{q(z_{1:t}|x_{1:t})} \mathbb{E}_{q(c_1|z_{1:t}, x_{1:t})} \log \frac{p(c_t|z_t)}{q(c_1|z_{1:t}, x_{1:t})} =$$
$$-\mathbb{E}_{q(z_{1:t}|x_{1:t})} D_{KL}(q(c_t|z_{1:(t-1)}) \| p(c_t|z_t))$$

The above expression is the KL divergence between two distributions: the factor $q(c_t|z_{1:(t-1)})$ and $p(c_t|z_t)$.

The last term can also be simplified to:

$$\mathbb{E}_{\prod_{i=1}^{t} q(z_i|x_i)} \sum_{i=1}^{t} \log \frac{p(z_i)}{q(z_i|x_i)} = -\sum_{i=1}^{t} D_{KL}(q(z_i|x_i) \| p(z_i))$$

Equation 10 above measures the KL divergence between the factor $q(z_i|x_i)$ of the variational approximation and the latent prior $p(z_t)$.

In one embodiment, parameters $\phi$, $\theta$, and $\gamma$ of the network are learned by minimizing the sum of lower bounds over training samples:

$$\mathcal{L}(\phi, \theta, \gamma) = \Sigma_{x_{1:t}} \mathcal{L}(\phi, \theta, \gamma; x_{1:t}) \quad \text{(Eq. 11)}$$

In equation 11 above, the $\mathcal{L}(\phi, \theta, \gamma; x_{1:t})$ is the sum of three components:

$$\mathbb{E}_{q(z_{1:t}, x_{1:t})} \left( -\sum_{i=1}^{t} \log p(x_i|z_i) + D_{KL}(q(c_t|z_{1:(t-1)}) \| p(c_t|z_t)) \right) +$$
$$\sum_{i=1}^{t} D_{KL}(q(z_i|x_i) \| p(z_i))$$

For example, in the equation of $\mathcal{L}(\phi, \theta, \gamma; x_{1:t})$, the first component plays the roll of reconstructing the original input data, the last component represents the divergence of the variational distribution $q(z_i|x_i)$ from the prior $p(z_i)$, which can be assumed to be Gaussian with zero mean and unit norm standard deviation. The second regularization enforces the variational condition $q(c_t|z_{1:(t-1)})$ to be closed to the distribution $p(c_t|z_t)$ in the latent space. This condition implies that the output random variable of the recurrent network conditioned on the inputs $z_{1:(t-1)}$ has similar distribution as that of $c_t$ conditioned on $z_t$. In one embodiment, both distributions have Gaussian forms with means $h(z_{1:(t-1)})$ and $z_t$, respectively. This regularization imposes the predictive capability of the latent embedding: the random variable $z_t$ is the proximity of the encoded $h(z_{1:(t-1)})$. This proximity is translated to the input domain via minimizing the reconstruction error between the actual $x_t$ and the sample from decoder. This sample is the function of the observed history $x_{1:(t-1)}$.

To make the loss function more flexible in term of assigning different weights for each loss component, in one embodiment, regularization parameters $\alpha$ and $\beta$ are introduced on KL divergences to control the balance between reconstruction and KL losses. Furthermore, Monte Carlo estimates of the expectation in equation 12 above can be formed via the K samples $\{z_{1:t}^{(k)}\}_{k=1}^{K}$. The objective may have the following approximation form:

$$\mathbb{E}(\phi, \theta, \gamma; x_{1:t}) = \mathbb{E}_1(x_{1:t}) + \alpha \mathcal{L}_2(x_{1:t}) + \beta \mathcal{L}_3(x_{1:t}) \quad \text{(Eq. 13)}$$

Where:

$$\mathcal{L}_1(x_{1:t}) \stackrel{\Delta}{=} -\sum_{i=1}^{t} \frac{1}{K} \sum_{k=1}^{K} \log p(x_i|z_i^{(k)}), \quad \text{(Eq. 14)}$$

$$\mathcal{L}_2(x_{1:t}) \stackrel{\Delta}{=} \frac{1}{K} \sum_{k=1}^{K} D_{KL}(q(c_t|z_{1:(t-1)}^{(k)}) \| p(c_t|z_t^{(k)})), \text{ and} \quad \text{(Eq. 15)}$$

$$\mathcal{L}_3(x_{1:t}) \stackrel{\Delta}{=} \sum_{i=1}^{t} D_{KL}(q(z_i|x_i) \| p(z_i)). \quad \text{(Eq. 16)}$$

In one embodiment, the variational factor is $q(c_t|z_{1:(t-1)}) \sim \mathcal{N}(c_t; \mu_t, \sigma_t^2)$, which is the multivariate Gaussian with diagonal covariance matrix with variance $\sigma_t^2$. Here, $\mu_t$, $\sigma_t^2$ is parametrized by RNN with parameters $\gamma$: $\mu_t = h_\mu(z_{1:(t-1)})$ and $\sigma_t^2 = h_\sigma(z_{1:(t-1)})$. Additionally, we make the assumption $p(c_t|z_t) \sim \mathcal{N}(c_t; z_t, I)$. With these assumptions, the KL divergences are analytically derived. In one embodiment, a reparameterization trick is applied to optimize equation 11 above.

In one embodiment, the variational distribution $q(c_{1:t}, z_{1:t}|x_{1:t})$ can be introduced to monitor the divergence between $q(c_i|z_{1:(i-1)})$ and $p(c_i|z_i)$ for all i, which we skip due to the similar derivation. In this embodiment, only $\mathbb{E}_2$ is changed to the following expression:

$$\mathcal{L}_2(x_{1:t}) = \frac{1}{K}\sum_{i=2}^{t}\sum_{k=1}^{K}D_{KL}(q(c_i|z_{1:(i-1)}^{(k)})\|p(c_i|z_i^{(k)}))\qquad\text{(Eq. 17)}$$

Figure 4:
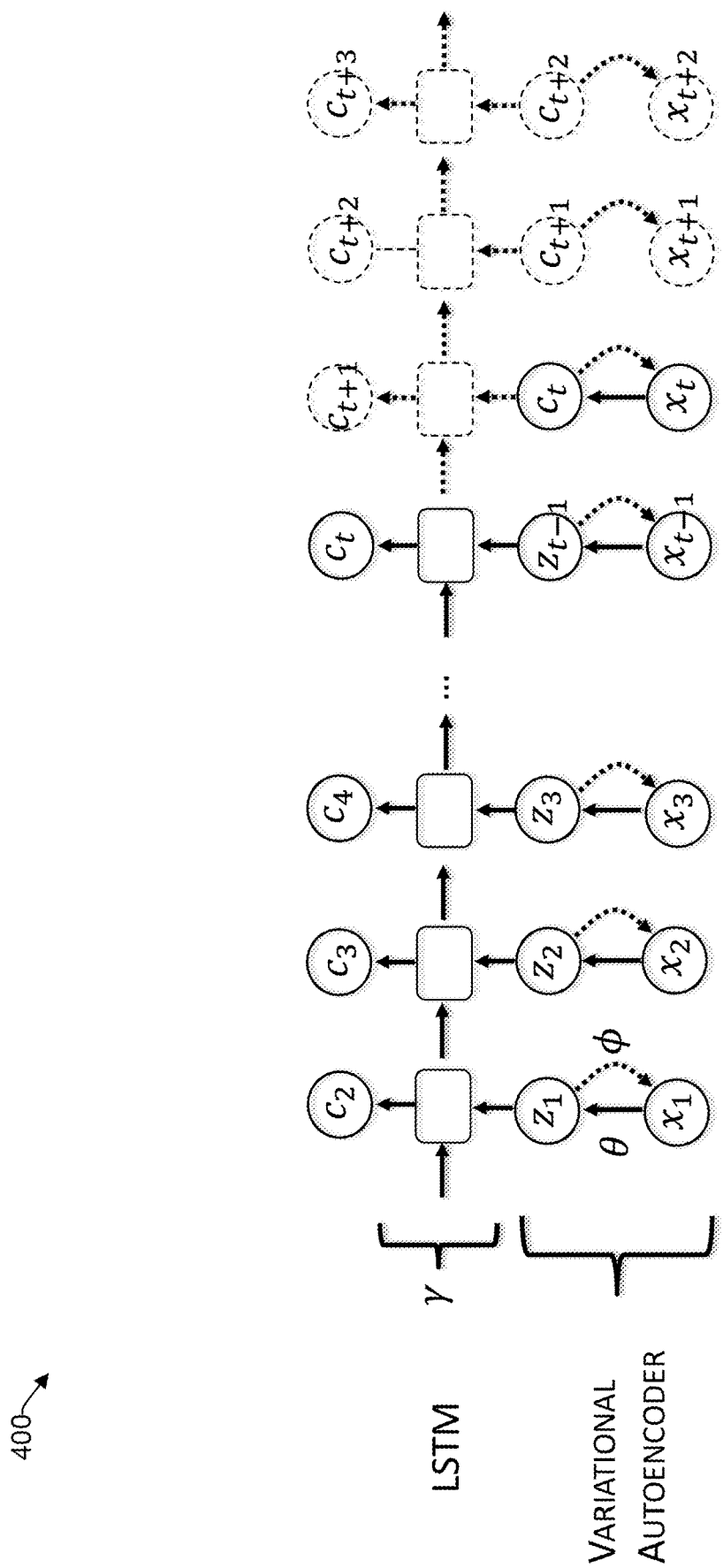
FIG. 4 is a conceptual block diagram of a predictive latent variational autoencoder configured to provide multiple predictive steps, consistent with an illustrative embodiment.

With the foregoing explanation of providing a predictive state of a complex system, reference now is made to FIG. 4, which is a conceptual block diagram 400 of a predictive latent variational autoencoder (PVAE) configured to provide multiple predictive steps, consistent with an illustrative embodiment. Similar to the architecture discussed in the context of FIG. 3, the multivariate event sequences are projected to a lower stochastic latent embedding. The temporal structure of the sequences is learned in the latent space. A probabilistic prediction in the stochastic latent space is transferred to the event prediction. In addition, the architecture of FIG. 4 can provide multiple step prediction by autoregressively predicting latent variables at different future points in time $x_t$, $x_t+1$, $x_t+2$, etc. In one embodiment, the model can stay in the latent space and does not need to go back to the ambient (e.g., original data) space at every prediction step. Stated differently, intermediate predictions may not be necessary in order to make a more long-term prediction. For example, a weekly prediction is not necessary to make a prediction for next month.

The teachings herein use a novel VAE-based architecture, referred to herein as a PVAE, which can be used to capture the event interarrival time distribution, predict the next event in high-dimensional multivariate sequences, as well as simulate the sequences for longer prediction horizons. The architecture uses novel strategies to ensure that temporal dynamics and correlation structures of the event sequence is captured. The architecture efficiently learns the correlation across different event sequences, capture temporal dynamics of the sequences, learns a representation that can be used for other tasks, and probabilistically predicts multiple steps into the future. In some embodiments, the architecture also employs strategies to ensure that learning complex event sequences is possible by imposing a sparse representation on the underlying model.

By virtue of the teachings herein a holistic view of a complex system, such as a manufacturing plant is provided, as well as accurate predictions in different points in time. These predictions are not based on a review of variables individually; rather, all the variables in the data are analyzed together to find relationships between them, to provide a more accurate prediction of events. In this way, a better understanding of the complex system is facilitated by an appropriately configured computing device and the control thereof simplified and made more efficient. Events can be predicted and even avoided. While, to facilitate the present discussion, a manufacturing plant is used as an example of a complex system, it will be understood that other large and complex systems that cannot be practically coordinated by a human, such as healthcare, time series forecasting, video activity predictions, and others are within the scope of the teachings herein.

Example Process

Figure 5:
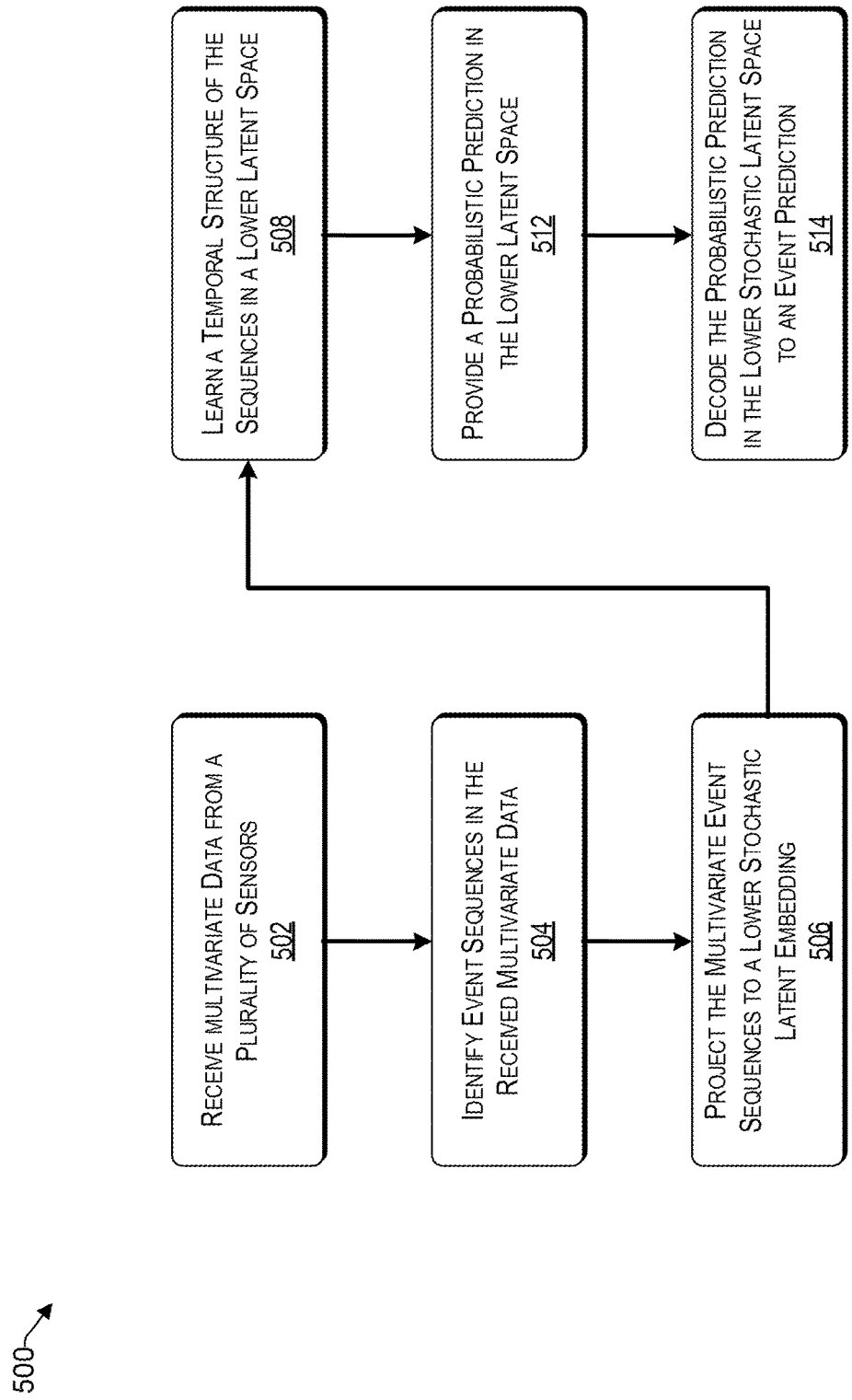
FIG. 5 presents an example processes, for an automated generation of an optimization model for system-wide plant optimization based on multivariate event data, consistent with illustrative embodiment.

With the foregoing overview of the example architecture 100 of FIG. 1 and example PVAEs 300 and 400 of FIGS. 3 and 4, it may be helpful now to consider a high-level discussion of an example process. To that end, FIG. 5 presents an example processes 500, for an automated generation of an optimization model for system-wide plant optimization based on multivariate event data, consistent with illustrative embodiment. Process 500 is illustrated as a collection of blocks in a logical flowchart, which represents sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 500 is described with reference to the architectures 100 and 300 of FIGS. 1 and 3, respectively.

At block 502 multivariate data 102 from a plurality of sensors (e.g., components of a plant) in an ambient state is received, for one or more observation points (e.g., $x_1$ to $x_{t-1}$). For example, the multivariate data 102 from the sensors may comprise event sequences.

At block 504, event sequences in the received multivariate data are identified.

At block 506, the multivariate event sequences are projected to a lower stochastic latent embedding.

At block 508, a temporal structure of the sequences is learned in the latent embedding (e.g., 310). A correlation (e.g., 302) between variables in the sequences in the lower latent space is determined.

At block 512, a probabilistic prediction (e.g., 330) is provided in the lower latent space.

At block 514, the probabilistic prediction in the lower stochastic latent space is decoded to an event prediction in the ambient state (e.g., $x_t$ 340).

Example Computer Platform

Figure 6:
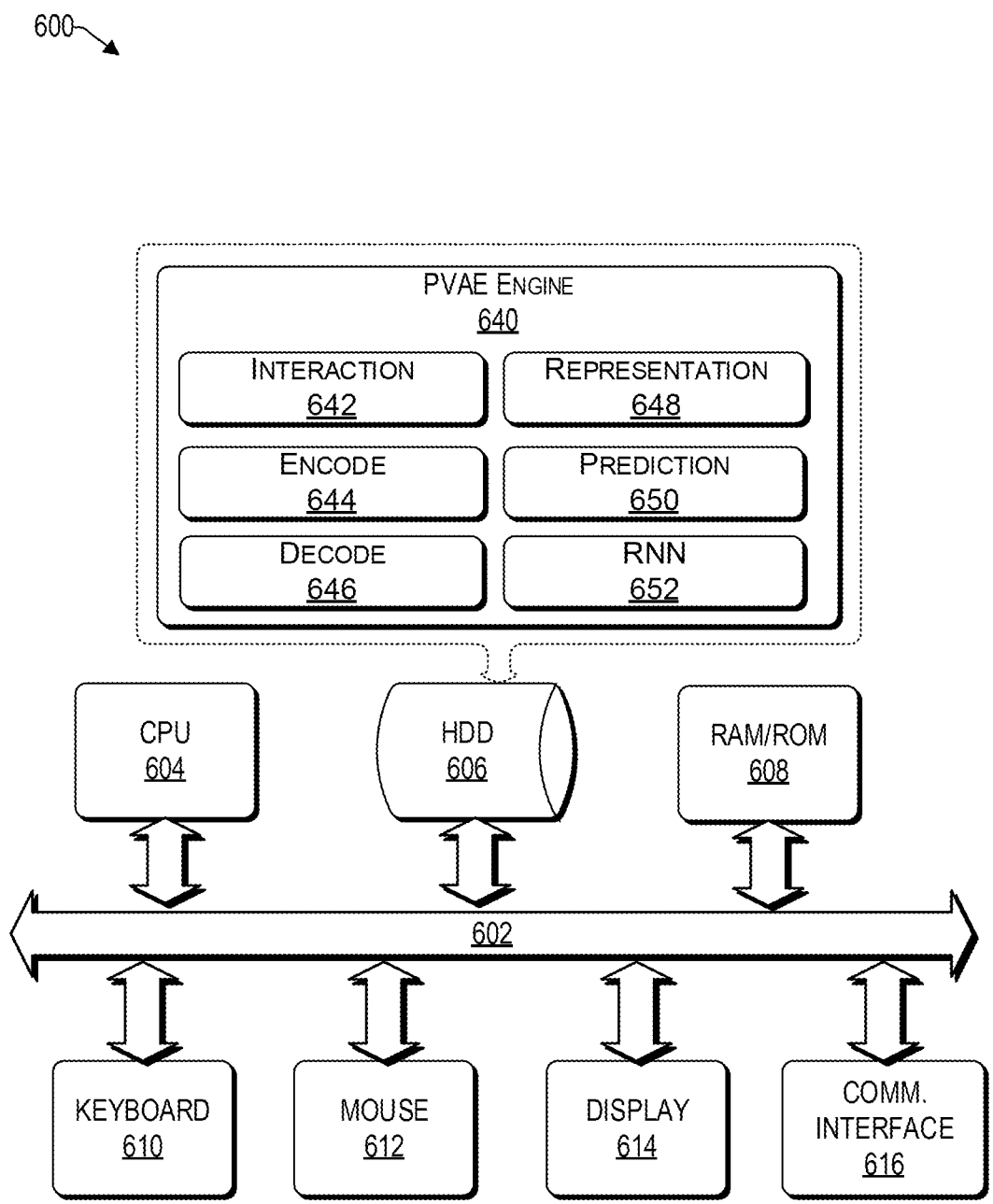
FIG. 6 is a functional block diagram illustration of a particularly configured computer hardware platform that can communicate with various networked components, consistent with an illustrative embodiment.

As discussed above, functions relating to methods and systems for the automated generation of an optimization model for system-wide plant optimization based on multivariate event data can be performed with the use of one or more computing devices connected for data communication via wireless or wired communication. FIG. 6 is a functional block diagram illustration of a computer hardware platform that can communicate with various networked components, such as a training input data source, the cloud, etc. In particular, FIG. 6 illustrates a network or host computer platform 600, as may be used to implement a server, such as an analytics server that can support the predictive model 104 of FIG. 1.

The computer platform 600 may include a central processing unit (CPU) 604, a hard disk drive (HDD) 606, random access memory (RAM) and/or read only memory (ROM) 608, a keyboard 610, a mouse 612, a display 614, and a communication interface 616, which are connected to a system bus 602.

In one embodiment, the HDD 606, has capabilities that include storing a program that can execute various processes, such as the PVAE engine 640, in a manner described herein. The analytics engine 640 may have various modules configured to perform different functions. For example, there may be an interaction module 642 that is operative to interact with one or more sensors of a complex system to receive data therefrom, such as multivariate observation data in the form of time series at different points in time. There may be an encoding module 644 that is operative to map data from an ambient state (e.g., $x_1$) to a lower dimensional manifold (e.g., z1). There may be a decode module 646 that is operative to go in the reverse direction as the encoder, namely decode data from the lower dimensional manifold (e.g., $Z_t$) to the ambient state (e.g., $x_t$). There may be a representation module that is operative to provide a latent representation of multiple time series of an entire system. In one embodiment, there is a prediction module 650 operative to predict a next event. In one embodiment there is a recurrent neural network (RNN) module configured to capture temporal dynamics of an event history from the compact representation of latent variables of a complex system.

Example Cloud Platform

As discussed above, functions relating to an for an efficient symbolic sequence analytics using random sequence embeddings, may include a cloud. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
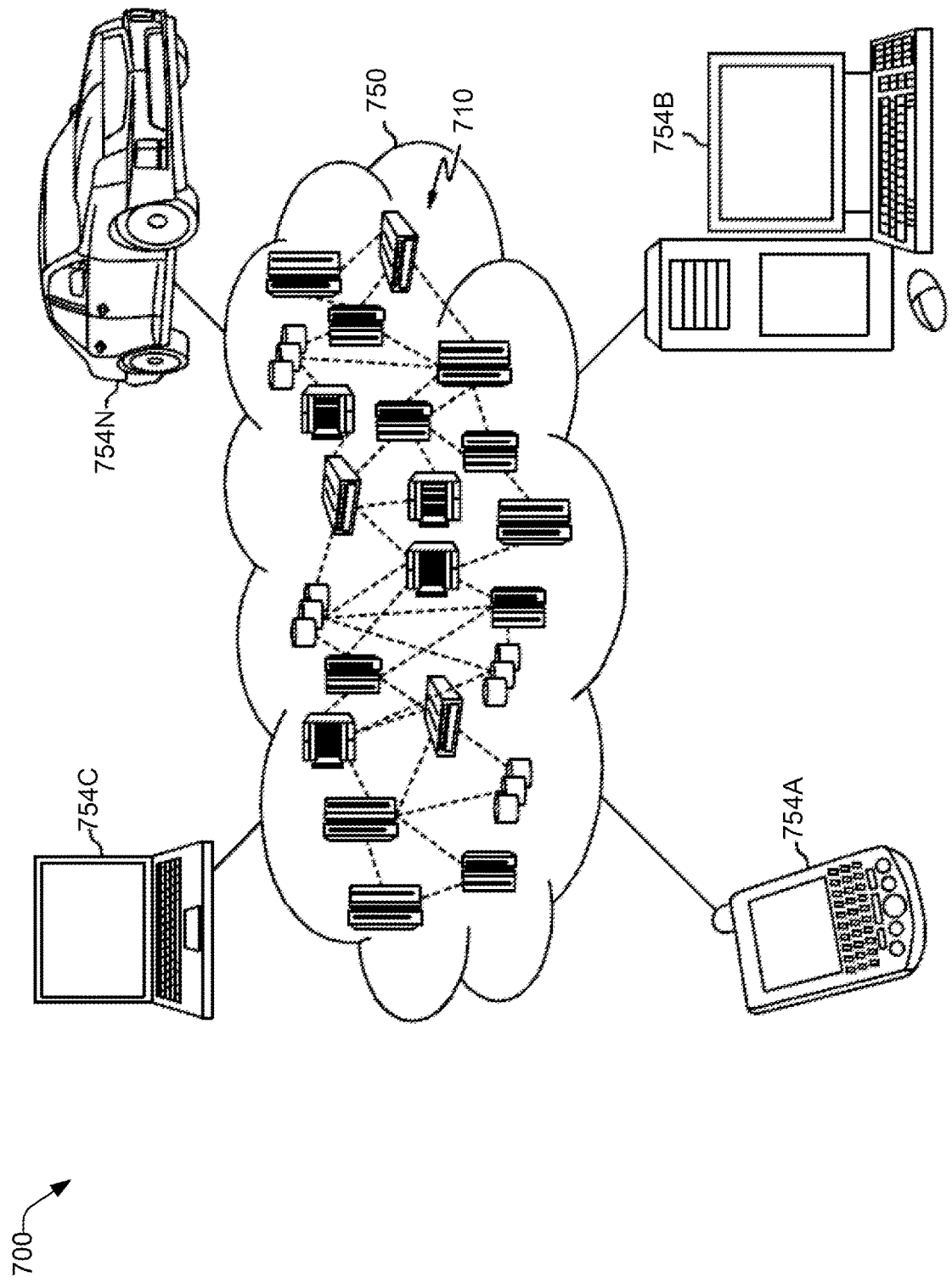
FIG. 7 depicts a cloud computing environment, consistent with an illustrative embodiment.

Referring now to FIG. 7, an illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
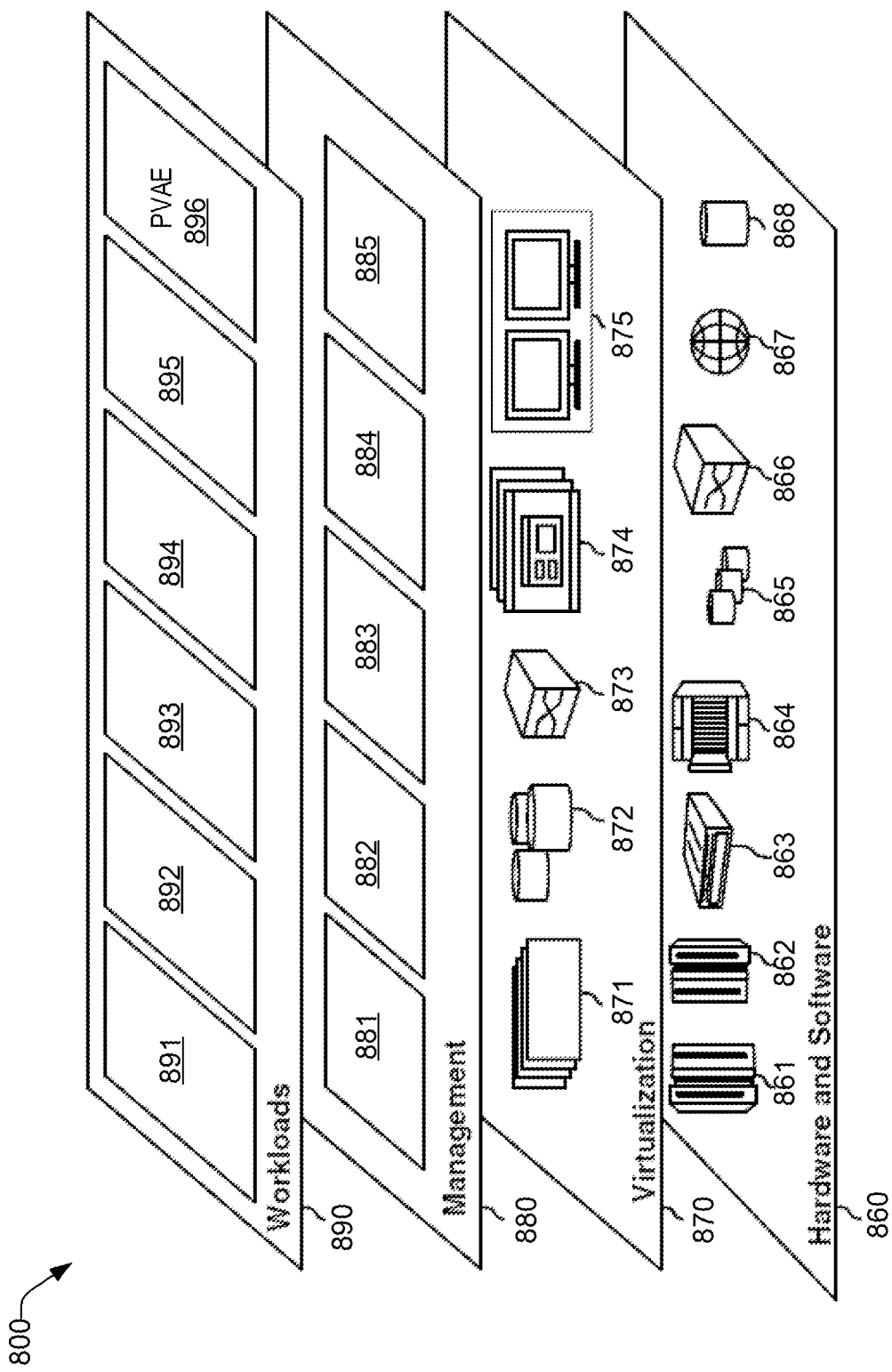
FIG. 8 depicts abstraction model layers, consistent with an illustrative embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and PVAE 896, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
    a processor;
    a network interface coupled to the processor to enable communication over a network;
    a storage device coupled to the processor;
    an engine stored in the storage device, wherein an execution of the engine by the processor configures the computing device to perform acts comprising:
        receiving multivariate data from a plurality of sensors of a system in an ambient state;
        identifying event sequences in the received multivariate data;
        projecting the multivariate event sequences to a lower stochastic latent embedding;
        learning a temporal structure of the sequences in a lower latent embedding;
        providing a probabilistic prediction in the lower latent space; and
        decoding the probabilistic prediction in the lower stochastic latent space to an event prediction in the ambient state; and
        adjusting one or more components of the system to prevent the predicted event.

2. The computing device of claim 1, wherein the multivariate data comprises event sequences of different variables.

3. The computing device of claim 2, wherein at least some of the different variables are interrelated.

4. The computing device of claim 2, wherein the execution of the engine further configures the computing device to perform an act comprising compressing the event sequences into a compact representation of latent variables.

5. The computing device of claim 4, wherein the execution of the engine further configures the computing device to perform an act comprising using a recurrent neural network (RNN) to capture temporal dynamics of an event history from the compact representation.

6. The computing device of claim 4, wherein the execution of the engine further configures the computing device to perform an act comprising using learned dynamics in the compact representation to detect a period of anomalous behavior of the system.

7. The computing device of claim 1, wherein projecting the multivariate event sequences to a lower stochastic latent embedding is by way of a variational auto encoder (VAE).

8. The computing device of claim 1, wherein the execution of the engine further configures the computing device to perform an act comprising providing an uncertainty of the prediction in the ambient state.

9. The computing device of claim 1, wherein the system is an industrial plant.

10. The computing device of claim 1, wherein the variables comprise two or more of pressure, temperature, motion, volumetric flow, or sound level.

11. The computing device of claim 1, wherein the execution of the engine further configures the computing device to perform an act comprising providing multiple time step prediction by autoregressively predicting latent variables at different future points in time.

12. A non-transitory computer readable storage medium tangibly embodying a computer readable program code having computer readable instructions that, when executed, causes a computer device to carry out a method of administering a system, the method comprising:
    receiving multivariate data from a plurality of sensors of the system in an ambient state;
    identifying event sequences in the received multivariate data;
    projecting the multivariate event sequences to a lower stochastic latent embedding;

learning a temporal structure of the sequences in a lower latent embedding;

providing a probabilistic prediction in the lower latent space;

decoding the probabilistic prediction in the lower stochastic latent space to an event prediction in the ambient state; and adjusting one or more components of the system to prevent the predicted event.

13. The non-transitory computer readable storage medium of claim 12, wherein the multivariate data comprises event sequences of different variables.

14. The non-transitory computer readable storage medium of claim 13, further comprising compressing the event sequences into a compact representation of latent variables.

15. The non-transitory computer readable storage medium of claim 12, further comprising projecting the multivariate event sequences to a lower stochastic latent embedding is by way of a variational auto encoder (VAE).

16. The non-transitory computer readable storage medium of claim 12, further comprising providing an uncertainty of the prediction in the ambient state.

17. The non-transitory computer readable storage medium of claim 12, further comprising providing multiple time step prediction by autoregressively predicting latent variables at different future points in time.

18. A computer implemented method, comprising:

receiving multivariate data from a plurality of sensors of the system in an ambient state;

identifying event sequences in the received multivariate data;

projecting the multivariate event sequences to a lower stochastic latent embedding;

learning a temporal structure of the sequences in a lower latent embedding;

providing a probabilistic prediction in the lower latent space;

decoding the probabilistic prediction in the lower stochastic latent space to an event prediction in the ambient state; and adjusting one or more components of the system to prevent the predicted event.

* * * * *